US011946258B1

(12) United States Patent
Sokola

(10) Patent No.: US 11,946,258 B1
(45) Date of Patent: Apr. 2, 2024

(54) ADJUSTABLE STEP SYSTEM

(71) Applicant: Leonard Sokola, Clayton, NC (US)

(72) Inventor: Leonard Sokola, Clayton, NC (US)

( * ) Notice: Subject to any disclaimer, the term of this patent is extended or adjusted under 35 U.S.C. 154(b) by 0 days.

(21) Appl. No.: 18/221,016

(22) Filed: Jul. 12, 2023

(51) Int. Cl.
*E04F 11/104* (2006.01)
*A61H 3/00* (2006.01)
*E04F 11/02* (2006.01)
*E04F 11/022* (2006.01)
*E04F 11/035* (2006.01)

(52) U.S. Cl.
CPC .......... *E04F 11/1041* (2013.01); *E04F 11/02* (2013.01); *E04F 11/022* (2013.01); *A61H 2003/001* (2013.01); *E04F 11/0201* (2013.01); *E04F 2011/0203* (2013.01); *E04F 11/035* (2013.01)

(58) Field of Classification Search
CPC ..... E04F 11/1041; E04F 11/02; E04F 11/022; E04F 11/0201; E04F 11/035; E04F 11/0203; A61H 2003/001
See application file for complete search history.

(56) References Cited

U.S. PATENT DOCUMENTS 391,840 A * 10/1888 Gildemeyer ......... A47G 27/065 16/14
2,206,862 A * 7/1940 Boyd ...................... E04F 11/16 52/182
3,035,671 A 5/1962 Sicherman
D287,283 S 12/1986 Johnson
4,844,199 A 7/1989 Nimz
5,131,494 A * 7/1992 Heifetz .................... A61H 3/00 182/113
5,355,904 A 10/1994 Wallum
5,357,876 A 10/1994 Kniefel et al.
5,664,379 A * 9/1997 Kroll ....................... E04F 11/02 D25/69
5,924,249 A 7/1999 Kroll et al.
5,957,146 A * 9/1999 Corey ...................... A61H 3/00 52/645
8,141,680 B2 3/2012 Wigutoff
D673,299 S 12/2012 Balducki
10,434,028 B2 * 10/2019 Barto ...................... E04F 11/02
10,639,225 B1 5/2020 Gollands
10,876,296 B2 * 12/2020 Glassman ............. E04F 11/035
11,406,083 B1 * 8/2022 Jennings ............... E04F 11/025
2003/0024177 A1 * 2/2003 Hirata ..................... E04F 11/02 52/182

(Continued)

FOREIGN PATENT DOCUMENTS

CN 107237462 A * 10/2017
CN 113216538 A * 8/2021

(Continued)

*Primary Examiner* — Jessie T Fonseca
(74) *Attorney, Agent, or Firm* — COATS & BENNETT, PLLC

(57) ABSTRACT

An adjustable step system for assisting a person walking up or down a flight of stairs. The system includes adjustable steps that can be mounted to the stairs of the flight of stairs. The adjustable steps effectively reduce the required vertical height of a step that a person is required to take for each stair. The adjustable steps are also movable and can be positioned at a desired location along the width of the stairs when not in use.

16 Claims, 6 Drawing Sheets

(56) References Cited

U.S. PATENT DOCUMENTS

| | | | | |
|---|---|---|---|---|
| 2008/0257650 | A1* | 10/2008 | Schmidt | A61H 3/00 187/200 |
| 2011/0232214 | A1* | 9/2011 | Lin | E04F 11/0201 52/741.2 |
| 2013/0212960 | A1* | 8/2013 | Freund | E04F 11/09 52/741.2 |
| 2015/0275524 | A1* | 10/2015 | Fakouri | E04F 11/0201 182/223 |
| 2016/0346157 | A1* | 12/2016 | Barto | E04F 11/02 |
| 2019/0203476 | A1* | 7/2019 | Glassman | E04F 11/002 |

FOREIGN PATENT DOCUMENTS

| | | | | | |
|---|---|---|---|---|---|
| DE | 20112415 | U1 | * | 1/2002 | E04F 11/02 |
| DE | 20317692 | U1 | * | 4/2004 | E04F 11/02 |
| DE | 202008006461 | U1 | * | 10/2008 | |
| DE | 202008007895 | U1 | * | 11/2008 | E04F 11/02 |
| DE | 202015001652 | U1 | * | 7/2016 | |
| EP | 3026193 | A1 | * | 6/2016 | E04F 11/0201 |
| GB | 2275942 | A | * | 9/1994 | E04F 11/02 |
| GB | 2495414 | A | * | 4/2013 | E04F 11/0201 |
| GB | 2588982 | A | * | 5/2021 | E04F 11/02 |
| JP | H07286421 | A | * | 10/1995 | |
| JP | 11314871 | A | * | 11/1999 | E04F 11/0201 |
| JP | 2001065133 | A | * | 3/2001 | E04F 11/0201 |
| JP | 2022076520 | A | * | 5/2022 | |
| JP | 3240476 | U | * | 1/2023 | |
| KR | 20170031834 | A | * | 3/2017 | |
| KR | 20170039542 | A | * | 4/2017 | |
| WO | WO-9724498 | A1 | * | 7/1997 | |

* cited by examiner

ADJUSTABLE STEP SYSTEM

BACKGROUND

Many buildings include one or more flights of stairs to move between different floors. For example, many houses include a flight of stairs to move between the downstairs area and the upstairs area. The number of stairs in the flight can vary with each stair including a tread where the person places their foot and a riser that extends vertically behind the tread and extends to the adjacent stair.

It can be difficult for persons to walk up or down a flight of stairs. Examples include older persons who have difficulty walking, disabled persons, and injured persons. The difficultly can be caused by the height of stair measured between adjacent stairs. In some examples, the height can range between 6-8 inches. It can be difficult for a person to lift their leg this amount when stepping from a first step to a second step.

Various systems have been developed to assist a person in walking up and down a flight of stairs. However, the systems have a variety of drawbacks. Some systems are complicated and include a number of components. These systems are difficult to install and difficult to use. Further, the systems are fixed in place on the flight of stairs and cannot be moved. This fixed position can make it difficult for the stairs to be used in a normal manner.

SUMMARY

One aspect is directed to a system to assist a person along a flight of stairs that comprises a plurality of stairs. The system comprises a plurality of steps each configured to be mounted at one of the plurality of stairs. The steps comprise a block configured to be positioned on the tread of the stair with the block comprising a top side and a bottom side and the block having a height measured between the top side and the bottom side that is less than a height of a riser of the stair. A connector is connected to the block. A rail is configured to be mounted to the riser and extend outward from the riser and over the tread of the stair with the rail sized to engage with the connector. Each of the blocks is connected to the rail by the connector and movable along the rail to different lateral positions along a width of the stair.

In another aspect, the block comprises a back side that faces towards the riser when the blocked in connected to the rail and an opposing front side that faces outward away from the riser and wherein the connector is connected to and extends outward from the back side.

In another aspect, the height of the block is constant.

In another aspect, the block comprises a tapered shape with the height of the block increasing from the front side towards the back side.

In another aspect, a width of the block measured between opposing lateral sides is less than a width of the rail.

In another aspect, the rail comprises a pair of extensions that are configured to connect to the riser and a lateral section that extends between the pair of extensions, wherein the pair of extensions are parallel to one another and are perpendicular to the lateral section.

In another aspect, the block is constructed from wood and the connector and the rail are constructed from metal.

In another aspect, the top side of the block has a rectangular shape.

In another aspect, the connector comprises an opening with a sectional shape that matches a sectional shape of the rail.

One aspect is directed to a system to assist a person along a flight of stairs that comprises a plurality of stairs. The system comprising:

steps configured to be mounted at the stairs, each of the steps comprises: a block comprising a top side and a bottom side, a front side and a rear side that extend between the top side and the bottom side, and opposing lateral sides that extend between the top side and the bottom side. Each of the steps also comprises a connector connected to the rear side of the block with the connector comprising a body that extends around an opening; and a rail configured to be mounted to the riser and to extend outward from the riser with the rail sized to fit within the opening of the body. The block has a height measured between the top side and the bottom side that is less than a height of a riser of the stair. The block comprises a width measured between the lateral sides and with the width being shorter than the rail. The block is connected to the rail through the connector and movable along the rail.

In another aspect, the block is constructed from wood and the connector and the rail are constructed from metal.

In another aspect, the opening comprises a first sectional shape and rail comprises a second sectional shape with the first sectional shape and the second sectional shape being the same.

In another aspect, the block comprises a constant height.

In another aspect, the front side of the block comprises a tapered shape.

In another aspect, the rail comprises a pair of extensions that are configured to connect to the riser and a lateral section that extends between the pair of extensions, wherein the pair of extensions are parallel to one another and are perpendicular to the lateral section.

One aspect is directed to a method of assisting a person along a flight of stairs. The method comprises for each of the stairs in the flight of stairs: mounting a block to the stair by connecting a connector on the block to a rail that is mounted to a riser of the stair with the block comprising a top side that faces outward from a tread of the stair and a bottom side that contacts against the tread; sliding the block along the tread of the stair to a first section of the tread by moving the connector along the rail in a first direction; and after the person moves past the stair, sliding the block along the tread from the first section to a second section by moving the connector along the rail in a second direction.

In another aspect, the method further comprises aligning a front side of the block with a front edge of the tread of the stair.

In another aspect, the method further comprises contacting a lateral side of the block against a lateral side of the stair.

The features, functions and advantages that have been discussed can be achieved independently in various aspects or may be combined in yet other aspects, further details of which can be seen with reference to the following description and the drawings.

DETAILED DESCRIPTION

The present application is directed to an adjustable step system for assisting a person walking up or down a flight of stairs. The system includes adjustable steps that can be mounted to the stairs of the flight of stairs. The adjustable steps effectively reduce the required vertical height of a step that a person is required to take for each stair. The adjustable steps are also movable and can be positioned at a desired location along the width of the stairs when not in use.

Figure 1B:
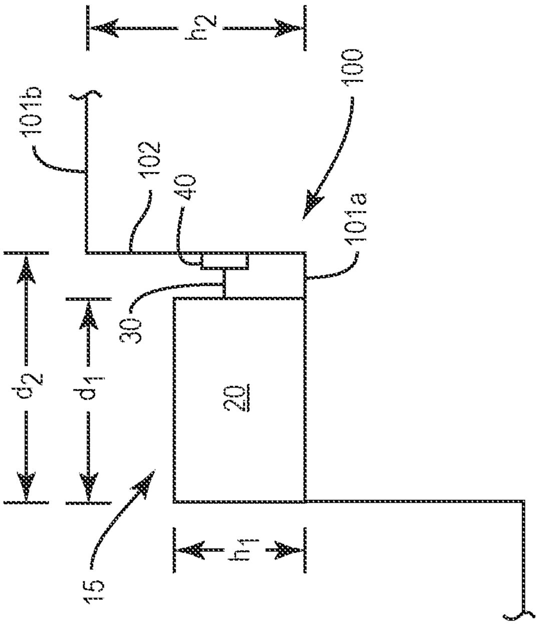
FIG. 1B is a schematic side of the view of the device of FIG. 1A.
Figure 1A:
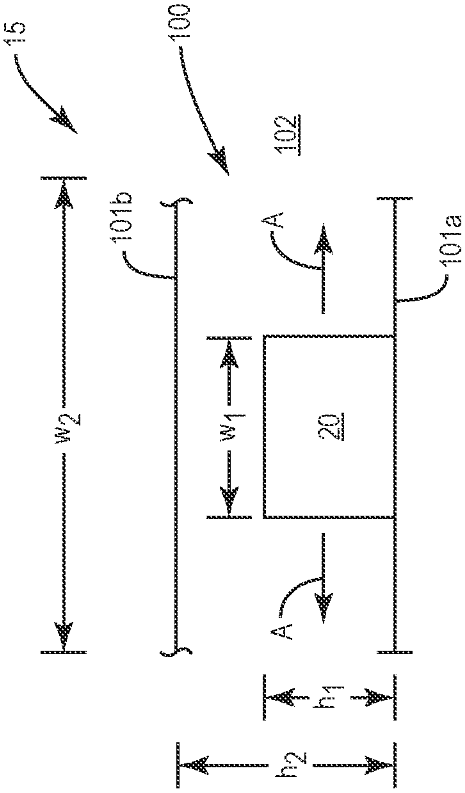
FIG. 1A is a schematic front view of a device with a block positioned on a tread.

As illustrated in FIGS. 1A and 1B, the system includes adjustable steps 15 that can be mounted to the stairs 100 of a flight of stairs. The adjustable steps 15 include a block 20 configured to contact against a tread 101 of the stair 100. A connector 30 extends outward from the block 20 and is configured to connect to a rail 40 on a riser 102 of the stair 100. The connector 30 is movable along the rail 40 such that the block 20 is movable along the tread 101 as illustrated by arrows A.

Figure 2:
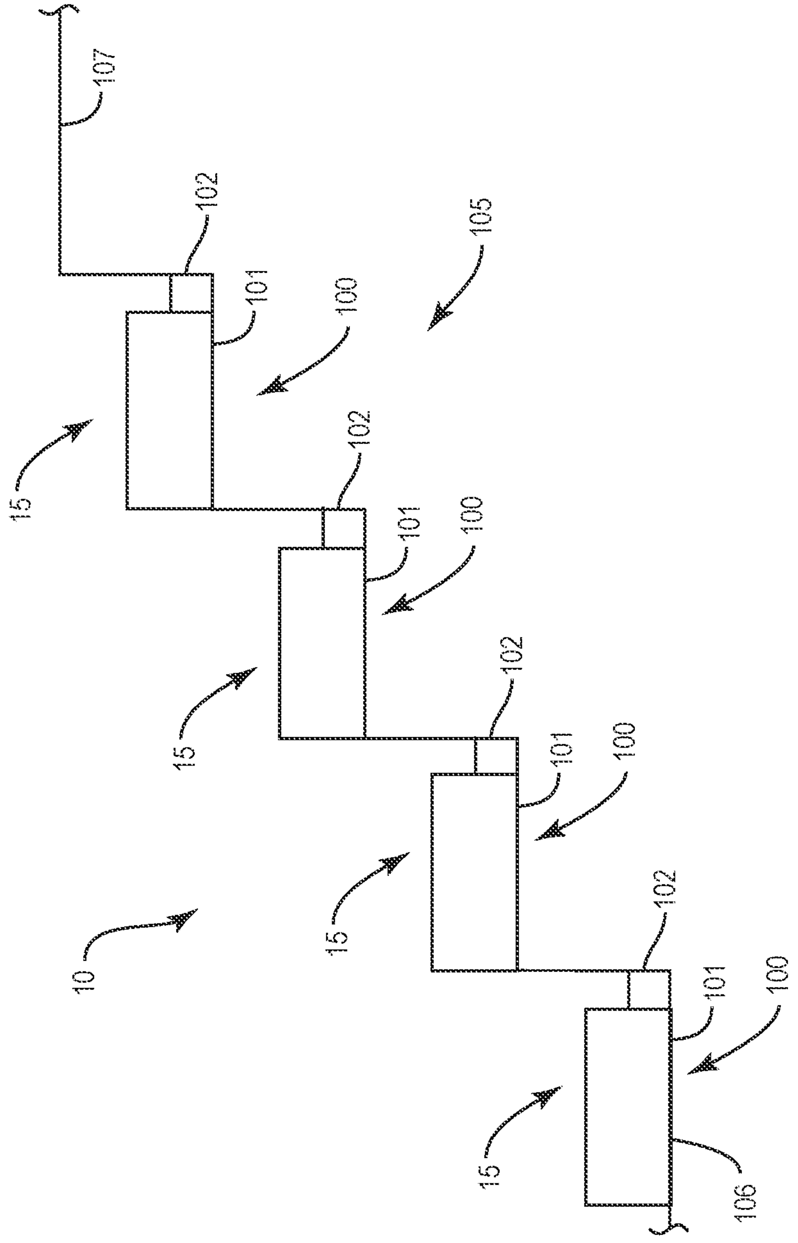
FIG. 2 is a side schematic view of a system having steps mounted to the stairs.

FIG. 2 illustrates a system 10 that is mounted on the stairs 100 of a flight 105 that extends between a bottom landing 106 and a top landing 107. The system 10 includes adjustable steps 15 that are mounted to each of the stairs 100. In one example as illustrated in FIG. 2, an adjustable step 15 is mounted to each of the stairs 100. In other examples, one or more stairs 100 do not include an adjustable step 15. In some examples as illustrated in FIG. 2, an adjustable step 15 is mounted at the bottom landing 106.

The device 15 facilitates a person walking up or down the flight 105. The blocks 20 have a height h1 that is less than the height h2 of the risers 102. Thus, the blocks 20 provide an intermediate step between a first tread 101*a* and a second tread 101*b*. Using FIGS. 1A and 1B as an example, a person walking up the flight would initially step on tread 101*a*, then onto the block 20, and then onto a second tread 101*b* of the adjacent stair 100.

The blocks 20 are smaller than the treads 101 to allow for an adequate amount of surface area to be exposed to be used as a support for the person using the stairs 100. The blocks 20 are also adjustable across the treads 101. This provides for the blocks 20 to be positioned on the tread 101 where needed to allow for the person to walk up or down the slight stairs 100. In some examples, the blocks 20 are moved to a central position along the width w when in use to facilitate a person walking up or down the stairs 100. The blocks 20 are then moved to the lateral sides of the treads 101 to not interfere with the normal use of the stairs 100 with a person that does not need assistance.

Figure 3:
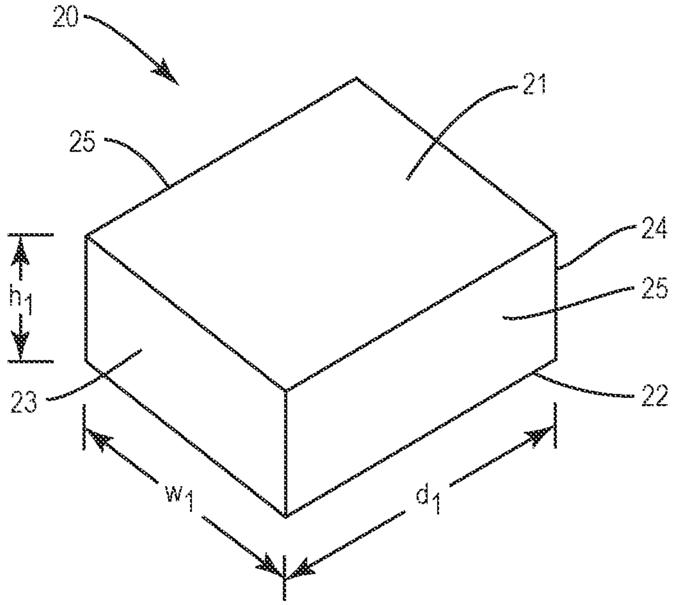
FIG. 3 is a perspective view of a block.

FIG. 3 illustrates an example of a block 20. The block 20 includes a top side 21 and an opposing bottom side 21. The top side 21 is exposed and is contacted by the person that is using the adjustable step 15. In some examples, the top side 21 is configured to prevent and/or reduce slipping, such as a knurled surface or a roughened surface. In some examples, the top side 21 includes a slip-resistant layer such as a rubber, cloth, or carpet. The bottom side 22 contacts against the tread 101. The height h1 of the block 20 is measured between the top side 21 and bottom side 22. In one example, the height h1 is consistent throughout the block 20. In other examples, the height h1 is different along the block 20. In some examples, one or both of the top side 21 and the bottom side 22 are flat.

The block 20 also includes a front side 23 and an opposing back side 24. The front side 23 faces outward when the block 20 is positioned on the tread 101. The back side 24 faces towards the riser 102 when the block 20 is positioned on the tread 101. The block 20 also includes opposing lateral sides 25 that extend between the front side 23 and the back side 24.

Figure 4:
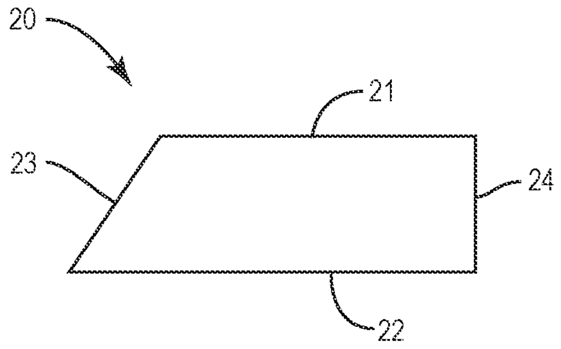
FIG. 4 is a side view of a block with a tapered front side.
Figure 8:
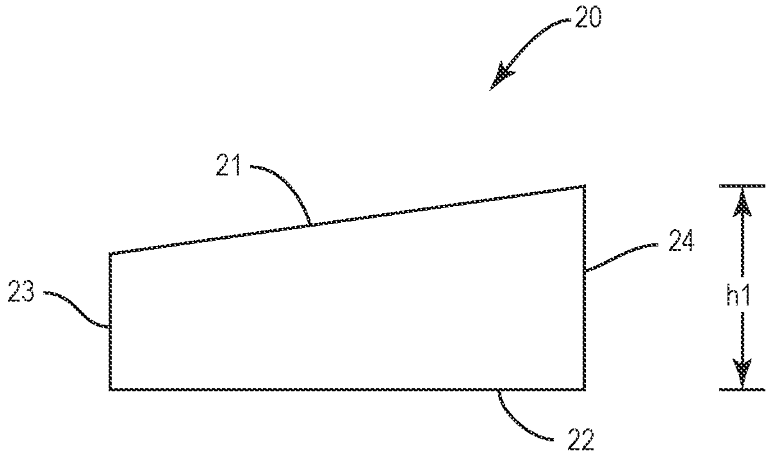
FIG. 8 is a side view of a block with a tapered height that is shorter at the front side and taller at the back side.

The block 20 can include a variety of shapes and sizes. In the various examples, the height h1 is less than the height h2 of the riser 102. In one example, the height h1 is constant throughout the block 20. In another example, the height h1 varies along one or more of the edges. FIG. 4 illustrates an example in which the front side 23 has a tapered shape. This shape can prevent a user from inadvertently contacting against the front side 23 when stepping towards the top side 21, particularly when the user is walking up the stairs 100. FIG. 8 illustrates an example with the block 20 having a tapered shape with a height h1 that is smaller at the front side 23 and larger at the back side 24.

The block 20 includes a width w1 that is measured between the opposing lateral sides 25. The width w1 is less than a width w2 of the stair 100 (as illustrated in FIG. 1A). This smaller size provides for a surface of the tread 101 to be exposed to be used as a step. This smaller size also provides for the block 20 to be moved laterally across the tread 101 to different positions.

The block 20 includes a depth d1 measured between the front side 23 and the back side 24. The depth d1 is less than a depth d2 of the tread 101 (as illustrated in FIG. 1B). This provides for the connector 30 to extend outward from the back side 24 and connect to the rail 40. In one example, the block 20 is positioned with the front side 23 aligned with the front edge of the tread 101.

The block 20 is constructed to support the full weight of a user. In some examples, the block 20 can support up to five hundred pounds. The block 20 can be constructed from a wide variety of materials with examples including but not limited wood, plastic, metals, and combinations thereof.

Figure 5:
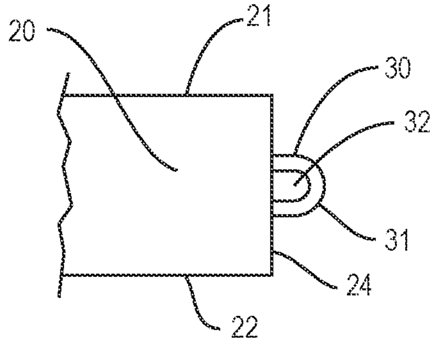
FIG. 5 is a partial side view of a connector connected to a block and extending outward from a back side.

The connector 30 extends outward from the block 20 and is configured to engage with the rail 40. FIG. 5 illustrates an example with the connector 30 having a curved body 31 that extends outward from the back side 24 of the block 20. The curved body 31 forms an opening 32 with the back side 24 that is configured to receive the rail 40. The connector 30 can include various shapes and configurations. In some examples, the sectional shape of the opening 32 matches the sectional shape of the rail 40 to facilitate sliding the connector 30 along the rail 40 when adjusting the position of the block 20 on the tread 101. In one example, a single connector 30 extends outward from the block 20. In other examples, two or more connectors 30 extend outward from the block 20. In one specific example, a pair of connectors 30 are spaced apart along the back side 24. The connector 30 can be connected to the block 20 in various manner including but not limited to threaded connection, mechanical fasteners, and adhesives. In one example, the connector 30 is constructed from metal.

Figure 6:
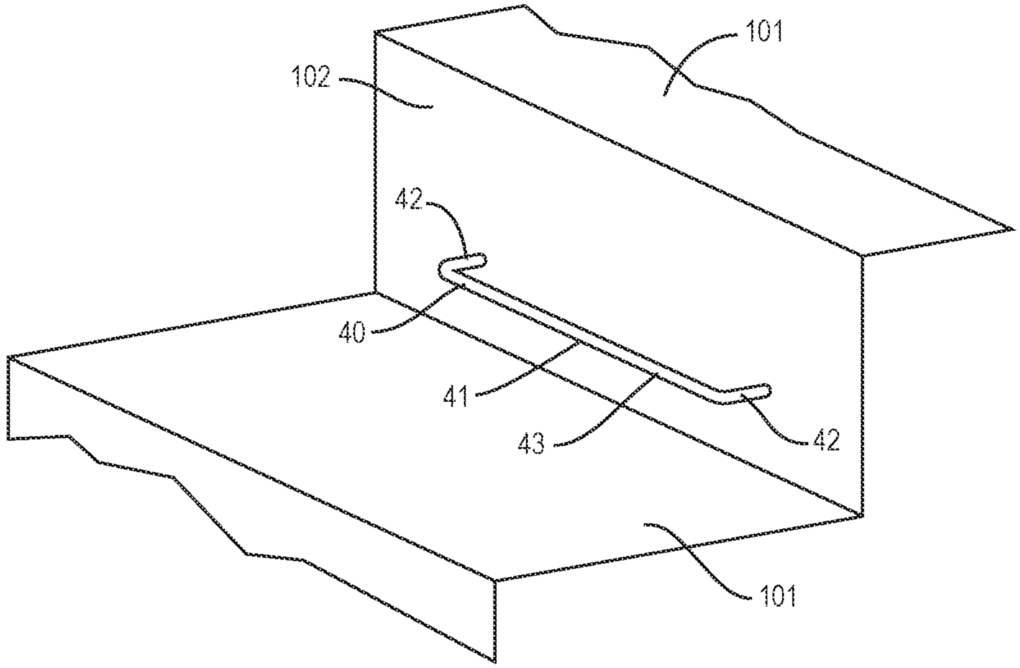
FIG. 6 is a perspective view of a rail connected to and extending outward from a riser of stairs.

The rail 40 extends outward from the riser 102 and engages with the one or more connectors 30. FIG. 6 illustrates an example with the rail 40 connected to and extending outward from the riser 102. The rail 40 is spaced upward from and extends over the tread 101. In some examples as illustrated in FIG. 6, the rail 40 includes extensions 42 and a lateral section 43. The extensions are sized to space the lateral section 43 outward away from the riser 102 to allow the connector 30 to slide along the lateral section 43. In some examples, the extensions 42 are configured to be parallel to one another and perpendicular to the lateral section 43. In some examples, the sectional shape of the rail 40 matches the sectional shape of the opening 32 in the connector 30. This facilitates sliding motion of the connector 30 along the rail 40.

The rail 40 is fixedly attached to the riser 102. In some examples, the extensions 42 are sized to fit into holes in the riser 102. The extensions 42 are connected to the riser 102 through various methods, such as but not limited to threaded connection, mechanical fastener, and adhesive.

Figure 7A:
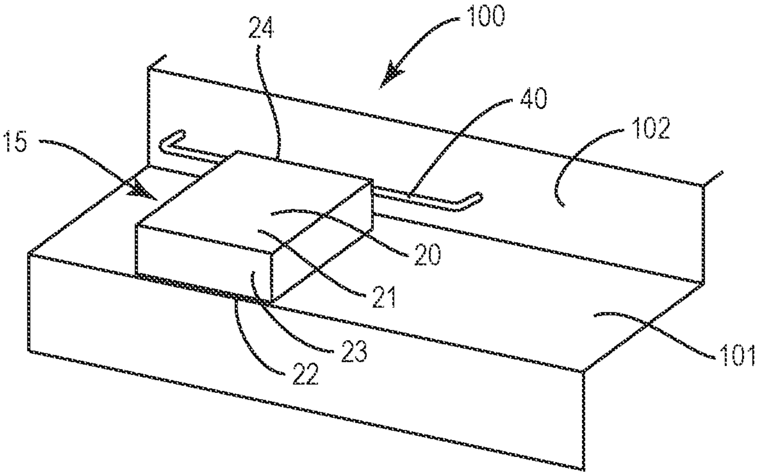
FIG. 7A is a front perspective view of a block in a first central position along stairs.
Figure 7B:
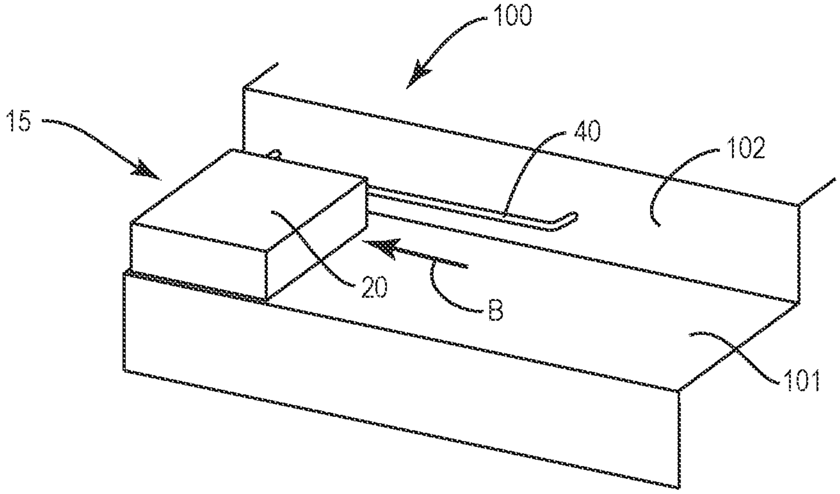
FIG. 7B is a front perspective view of the block of FIG. 6A now at a lateral position along a first lateral side of the stairs.
Figure 7C:
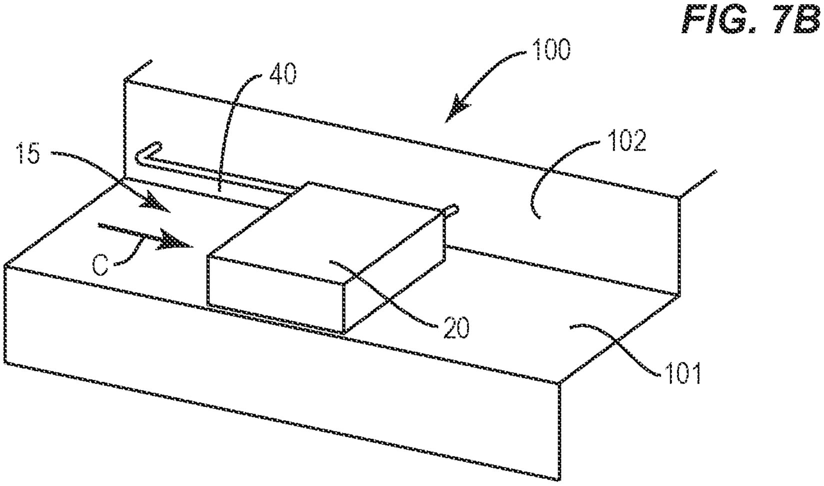
FIG. 7C is a front perspective view of the block of FIG. 6A now at a lateral position along a second lateral side of the stairs.

FIGS. 7A, 7B, and 7C illustrate an example of an adjustable step 15 mounted on a stair 100. The block 20 is positioned on the tread 101 with the top side 21 exposed and facing upwards and the bottom side 22 facing downward and in contact with the tread 101. The block 20 is connected by one or more connectors 30 (not illustrated) to the rail 40. The rail 40 is mounted to and extends outward from the riser 102 and above the tread 101. The block 20 has a height that is less than the riser 102. The block 20 also has a width that is less than the stair 100.

FIG. 7A illustrates the block 20 centrally positioned along the width of the stair 100. This positioning provides for a person to step with a first foot onto either lateral side of the tread 101. The user than steps with their other foot onto the top side 21 of the block 20.

FIG. 7B illustrates the block 20 moved along the rail 40 in the direction of arrow B. The block 20 is now positioned away from the central section of the stair 100 and along a first lateral side of the stairs 100. In this position, the central section of the stairs 100 is unencumbered to provide for persons not needing assistance to use the stairs 100 without interference from the device 15.

FIG. 7C illustrates the block 20 moved along the rail 40 in the direction of arrow C. This positions the block along a second lateral side of the stairs 100 and away from the central section of the stair 100.

In some examples that uses a device 15 with a set of blocks 20 along stairs 100, the user will have one foot that steps on each of the blocks 20 and the other foot that steps on the treads 101. For example, the right foot of a user will step on a first block 20 on a first step. Their next step will include their left foot stepping onto the second tread 101 of the second step. The next step will include their right foot stepping onto a second block 20 on the second step. The next step will include their left foot stepping onto the third tread 101 of the third step. This process continues along the length of the stairs 100.

In some examples, the extent of lateral movement of the block 20 is set by contact between the connector 30 and the extensions 41. In some examples, the extent of lateral movement is controlled by the block 20 contacting against the lateral sides of the stairs 100.

In one example, the system 15 is used to assist a person along a flight of stairs 105. A step 15 is mounted at each of the stairs 100 by mounting a block 20 to the stair 100 by connecting a connector 30 on the block 20 to a rail 40 that is mounted to a riser 102 of the stair 100. The block 20 is slid along the tread 101 of the stair 100 to a first section of the tread 101 by moving the connector 30 along the rail 40 in a first direction. After the person moves past the stair 100, the block 20 is slid along the tread 101 from the first section to a second section by moving the connector 30 along the rail 40 in a second direction.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are second ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. A system to assist a person along a flight of stairs that comprises a plurality of stairs, the system comprising:

a plurality of steps each configured to be mounted at one of the plurality of stairs, the steps comprising:

a block configured to be positioned on a tread of one of the stairs, the block comprising a top side, a bottom side, a front side, and a back side the block having a height measured between the top side and the bottom side that is less than a height of a riser of the stair;

a connector connected to the back side of the block and extends outward from the back side of the block;

a rail configured to be mounted to the riser and extend outward from the riser and over the tread of the stair, the rail sized to engage with the connector; and wherein for each one of the steps, the block is connected to the rail by the connector and movable along the rail to different lateral positions along a width of the stair;

wherein for each of the steps, the connector and the rail engage together within a gap formed between the back side of the block and the riser.

2. The system of claim 1, wherein the height of the block is constant.

3. The system of claim 1, wherein the block comprises a tapered shape with the height of the block increasing from the front side towards the back side.

4. The system of claim 1, wherein a width of the block measured between opposing lateral sides is less than a width of the rail.

5. The system of claim 1, wherein the rail comprises a pair of extensions that are configured to connect to the riser and a lateral section that extends between the pair of extensions, wherein the pair of extensions are parallel to one another and are perpendicular to the lateral section.

6. The system of claim 1, wherein the block is constructed from wood and the connector and the rail are constructed from metal.

7. The system of claim 1, wherein the top side of the block has a rectangular shape.

8. The system of claim 1, wherein the connector comprises an opening with a sectional shape that matches a sectional shape of the rail.

9. A system to assist a person along a flight of stairs that comprises a plurality of stairs, the system comprising:

steps configured to be mounted at the plurality of stairs, each of the steps comprising:

a block comprising:

a top side and a bottom side;

a front side and a back side that extend between the top side and the bottom side;

opposing lateral sides that extend between the top side and the bottom side;

a connector connected to the back side of the block, the connector comprising a body that extends around an opening;

a rail configured to be mounted to a riser and to extend outward from the riser, the rail sized to fit within the opening of the body;

wherein the block has a height measured between the top side and the bottom side that is less than a height of a riser of one of the plurality of stairs;

wherein the block comprises a width measured between the lateral sides and with the width being shorter than the rail;

wherein the block is connected to the rail through the connector and movable along the rail; and wherein the block is constructed from wood and the connector and the rail are constructed from metal.

10. The system of claim 9, wherein the opening comprises a first sectional shape and the rail comprises a second sectional shape with the first sectional shape and the second sectional shape being the same.

11. The system of claim 9, wherein the block comprises a constant height.

12. The system of claim 9, wherein the front side of the block is tapered.

13. The system of claim 9, wherein the rail comprises a pair of extensions that are configured to connect to the riser and a lateral section that extends between the pair of extensions, wherein the pair of extensions are parallel to one another and are perpendicular to the lateral section.

14. A method of assisting a person along a flight of stairs, the method comprising:

for each of the stairs in the flight of stairs:

mounting a block to the stair by connecting a connector that extends outward from a back side of the block to a rail that is mounted to a riser of the stair and that extends outward from the riser, the block comprising a top side that faces outward from a tread of the stair and a bottom side that contacts against the tread;

sliding the block along the tread of the stair to a first section of the tread by moving the connector along the rail in a first direction and with the connector sliding along the rail within a gap formed between the block and the riser; and after the person moves past the stair, sliding the block along the tread from the first section to a second section by moving the connector along the rail in a second direction and with the connector sliding along the rail within the gap formed between the block and the riser.

15. The method of claim 14, further comprising aligning a front side of the block with a front edge of the tread of the stair.

16. The method of claim 14, further comprising contacting a lateral side of the block against a lateral side of the stair.

* * * * *